No. 794,308. PATENTED JULY 11, 1905.
E. B. NOBLE.
CASING SPEAR.
APPLICATION FILED JULY 22, 1902.
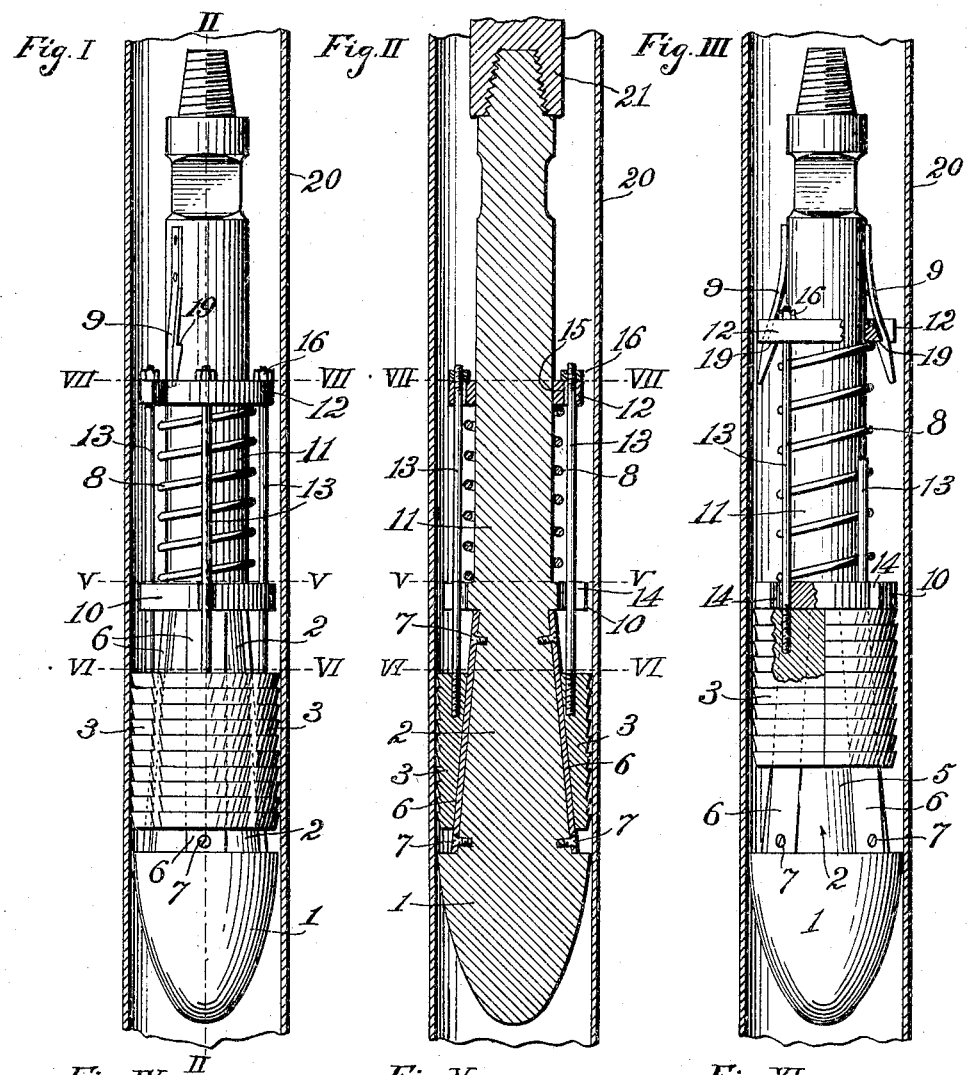
Witnesses
C. C. Holly
J. Townsend
Inventor
Eugene B. Noble
by
Townsend Bros
his attys No. 794,308. Patented July 11, 1905.

UNITED STATES PATENT OFFICE.

EUGENE B. NOBLE, OF LOS ANGELES, CALIFORNIA.

CASING-SPEAR.

SPECIFICATION forming part of Letters Patent No. 794,308, dated July 11, 1905.

Application filed July 22, 1902. Serial No. 116,566.

*To all whom it may concern:*

Be it known that I, EUGENE B. NOBLE, a citizen of the United States, residing at Los Angeles, in the county of Los Angeles and State of California, have invented a new and useful Casing-Spear, of which the following is a specification.

An object of this invention is to provide a simple and effective casing-spear which will draw the casing without any liability of distorting it from its circular form and which will engage the casing nearly all the way around the inside thereof and will let go more readily than former casing-spears.

Another object is to so construct the casing-spear as to protect the operative parts from liability of clogging with mud, and to accomplish this I arrange the slips below the spring and other parts which control the same. Furthermore, I provide for ready entry and passage of the casing-spear into and through the casing.

The accompanying drawings illustrate the invention.

Figure I is a view of my newly-invented casing-spear as it appears in a well-casing ready to take hold of the same. Fig. II is an axial section on line II II, Figs. I and IV. Fig. III is a view of the casing-spear tripped ready for withdrawal from the casing. Portions are broken for clearness of illustration. Fig. IV is a plan from the top of Fig. I, showing the well-casing intact. Figs. V, VI, and VII are sectional plans on lines V, VI, and VII, respectively, of Figs. I and II, showing the well-casing intact. Fig. VIII is an enlarged detail of a spring-tongue forming a latch and caught under the movable collar, as shown in Fig. III, for holding the slips in the contracted position for the removal of the tool from the casing.

1 is a body having a conical portion 2.

3 designates slips having curved faces 4 and fitting on the round face 5 of the conical portion 2 and slidingly secured thereon by dovetailed strips 6, fastened on said conical portion 2 by any suitable means, as the screws 7, the strips 6 acting as guides to retain the slips on the conical portion 2 of the body 1 and the said conical portion and guides serving to guide the slips into an inclined path, so as to cause the latter to move outwardly when the body 1 is pulled up, as hereinafter described.

8 is a spring for moving the slips up, and 9 a tripping-latch for holding the spring in position to allow the slips to remain down.

10 is a fixed projection above the taper portion 2 of the body.

11 is a stem above the projection 10.

12 is a sliding collar on the stem 11.

The plurality of slips 3 are arranged side by side and conjointly form a complete circle of members adapted to engage the casing when the slips are in contracted position throughout its entire inner circumference, thereby preventing any liability of distortion of the casing.

The spring 8 is between the projection 10 and the collar 12, resting on the one to force the other upward. The collar 12 is connected with the slips 3 by means of rods 13, secured to the slips and moving through openings 14 in the projection 10 and through holes 15 in the collar 12 and fastened against withdrawal therefrom by suitable means, as nuts 16 above said collar. The openings 15 in the collar and 14 in the projection 10 are radially elongated or slot-like in order that the rods 13 may have a movement toward and from the stem 11 to correspond with the movement of the slips 3 toward and from the axis of the body as the slips move up and down along the conical portion 2.

17 designates seats for the ends 18 of the latches 9, which are formed as spring-tongues whose ends are adapted to engage in the seats 17, the latter being formed as depressions to receive the ends of said spring-tongues. Said latches are desirably provided with shoulders 19 to catch under the collar 12 to sustain the same against downward movement after the latches have once been displaced and the collar forced up by the spring 8 into position shown in Fig. III.

In practical operation to lower the casing-spear into the casing 20 the latches 9 will be sprung in and brought into the cavity 17, thus holding the collar 12 down and leaving the slips free to slide up and down the conical portion 2. Then the tool is lowered through the casing 20 and the slips are free to move independently along the conical portion, so as to freely pass down. When the tool has reached the proper place, it will be drawn up by the string of tools 21, to which it is fastened, and the slips will catch in the casing and lift the same. When it is desired to withdraw the casing-spear, it will be jammed down forcibly by the string of tools through the slips 3, that are held by their engagement with the casing. As the conical portion passes down through the slips they are withdrawn from engagement with the casing, and thereupon the spring actuating thereon by means of the collar and rods causes the slips to travel upward along the body 2, being forced up by the spring 8 until they reach the fixed projection 10, and then the spear may be withdrawn from the casing 20, and, as shown in Fig. III, the latches 9 may catch under the collar, and thus prevent the slips from again being forced down.

In order to more easily assemble the parts together, the rods 13 are desirably screw-threaded at the upper end, and after the slips have been secured in place with their rods extending upward the spring 8 may be brought into position between the rods and stem. Then the collar 12 will be brought over the stem and the spring compressed thereby and the rods 13 brought through the holes 15 and secured by the nuts 16.

The lower end of the body terminates in a smooth taper-pointed swage, as shown in Figs. I, II, and III, to insure easy entry and passage of the casing-spear into and through the casing. Said swage may also serve to round out any dents in the casing.

Having described my invention, what I claim, and desire to secure by Letters Patent of the United States, is—

1. A body having a conical portion, slips having curved faces fitting on the rounded face of the conical portion and slidingly secured thereon, the said conical portion having guide-strips extending longitudinally thereof and the slips having grooves on their inner faces to engage said guide-strips and retain the slips on the conical portions, the outer faces of the slips meeting end to end and extending side by side to form a complete circle of slips when the slips are in contracted position, a spring above the conical portion, means arranged above said slips operated by the spring for lifting the slips and latches for temporarily holding said means from lifting the slips.

2. The combination of a body having a taper portion, a fixed projection above the taper portion, and a stem above the projection, a sliding collar on said stem, a latch for holding said collar down, a spring between the projection and collar for holding the collar up, slips slidingly connected with the taper portion, and means connecting the slips with the collar.

3. The combination of a body having a taper portion, a projection above the taper portion and a stem above the projection; slips slidingly connected to slide on the taper portion; a collar around the stem; a spring on the projection to hold the collar up; rods connecting the slips, respectively, with the collar; and spring-tongues on the stem to hold the collar down and having a tendency to normally release said collar.

4. The combination of a body having a stem, a radially-slotted projection and a taper portion; slips thereon moving up and down the taper portion; and stopping against the projection; a collar moving on the stem; and having radially-elongated openings; rods fastened to the slips, respectively, and moving through the slots and openings of the projection and collar, and a tapering latch for holding the collar down.

5. The combination of a body having a stem, a radially-slotted projection and a taper portion; slips thereon moving up and down the taper portion and stopping against the projection; a collar moving on the stem and having radially-elongated openings; rods fastened to the slips, respectively, and moving through the slots and openings of the projection and collar, a tapering latch for holding the collar down, and furnished with means for holding the collar up.

6. In a casing-spear, a body, a slip, a collar arranged to lift the slip and furnished in the top with a seat for a latch; and a shouldered spring fastened to the body and forming a latch arranged to enter such seat and having a tendency to release the collar to allow it to move up after the latch is unseated.

7. In a casing-spear, a slip, a collar arranged to lift the slip and furnished in the top with a seat for a latch; and a latch arranged to enter such seat, having a tendency to release the collar to allow it to move up after the latch is unseated, and furnished with a shoulder to engage the collar to hold it up after it has been caught thereon.

8. The combination of a body having a taper portion; slips thereon; rods fastened to the slips; a collar to which the slips are loosely connected by the rods; a spring for moving the collar up, and means for holding the collar down.

9. The combination of a body having a taper portion; slips thereon; rods fastened to the slips; a collar to which the slips are loosely connected by the rods; a spring for moving the collar up, and a spring-latch for holding the collar down.

10. A body having a conical portion and terminating at the lower end in a taper swage; slips sliding on the conical portion, a spring above the conical portion, means arranged above said slips and operated by the spring for lifting the slips the slips being provided with means independently connecting them to said lifting means, and latches for temporarily holding said means from lifting the slips.

In testimony whereof I have signed my name to this specification, in the presence of two subscribing witnesses, at Los Angeles, in the county of Los Angeles and State of California, this 11th day of July, 1902.

EUGENE B. NOBLE.

Witnesses:
   JAMES R. TOWNSEND,
   JULIA TOWNSEND.